United States Patent
Jia et al.

(10) Patent No.: US 11,015,750 B2
(45) Date of Patent: May 25, 2021

(54) PIPELINE DETECTION DEVICE AND METHOD

(71) Applicant: Tianjin Datro Technology Co., Ltd., Tianjin (CN)

(72) Inventors: Weixin Jia, Shanghai (CN); Jiangfeng Mou, Tianjin (CN)

(73) Assignee: Tianjin Datro Technology Co., Ltd., Tianjin (CN)

( * ) Notice: Subject to any disclaimer, the term of this patent is extended or adjusted under 35 U.S.C. 154(b) by 0 days.

(21) Appl. No.: 16/644,933

(22) PCT Filed: Jul. 18, 2018

(86) PCT No.: PCT/CN2018/096140
§ 371 (c)(1),
(2) Date: Mar. 5, 2020

(87) PCT Pub. No.: WO2019/047621
PCT Pub. Date: Mar. 14, 2019

(65) Prior Publication Data
US 2020/0284383 A1    Sep. 10, 2020

(30) Foreign Application Priority Data
Sep. 7, 2017    (CN) .......................... 201710801651.4

(51) Int. Cl.
*F16L 25/01* (2006.01)
*F02B 77/08* (2006.01)

(52) U.S. Cl.
CPC .............. *F16L 25/01* (2013.01); *F02B 77/08* (2013.01); *F16L 2201/10* (2013.01)

(58) Field of Classification Search
CPC ....... F16L 25/01; F16L 2201/10; F02B 77/08; H01R 2201/26
See application file for complete search history.

(56) References Cited

U.S. PATENT DOCUMENTS

| 6,698,410 | B2 | 3/2004 | Saba et al. |
| 2002/0016102 | A1* | 2/2002 | Saba ........................ F16L 25/01 439/188 |

(Continued)

FOREIGN PATENT DOCUMENTS

| CN | 201212901 Y | 3/2009 |
| CN | 101833052 A | 9/2010 |

(Continued)

*Primary Examiner* — Tho D Ta
(74) *Attorney, Agent, or Firm* — Christensen, Fonder, Dardi & Herbert PLLC

(57) ABSTRACT

The invention provides a pipeline detection device and method, which is applicable to a pipeline system of an automobile. A main pipeline of the pipeline system is connected with a male connector via a connection terminal, and a conductive structure is provided at the connection terminal. An anode end of the detection circuit is connected with a power supply end of an ECU unit of the automobile, and a cathode end of the detection circuit is connected with a ground end of the ECU unit. In this way, when the connection terminal correctly connects the main circuit with the male connector, the conductive structure is in conducting state, so that a current loop is formed between the detection circuit and the ECU unit, and whether an abnormality occurs in the pipeline system is detected based on a voltage on the detection circuit.

12 Claims, 4 Drawing Sheets

(56) References Cited

U.S. PATENT DOCUMENTS

| | | |
|---|---|---|
| 2003/0178015 A1 | 9/2003 | Saba et al. |
| 2011/0133759 A1* | 6/2011 | Chamberlin ........... H03K 17/97 324/682 |
| 2017/0089302 A1 | 3/2017 | Jones |

FOREIGN PATENT DOCUMENTS

| | | |
|---|---|---|
| CN | 201608362 U | 10/2010 |
| CN | 201772164 U | 3/2011 |
| CN | 103063979 A | 4/2013 |
| CN | 103176070 A | 6/2013 |
| CN | 103529346 A | 1/2014 |
| CN | 104501191 A | 4/2015 |
| CN | 105313700 A | 2/2016 |
| CN | 205089498 U | 3/2016 |
| CN | 205611033 U | 9/2016 |
| CN | 205840948 U | 12/2016 |
| CN | 106549272 A | 3/2017 |
| CN | 206111271 U | 4/2017 |
| CN | 106646077 A | 5/2017 |
| CN | 107152323 A | 9/2017 |
| CN | 107165696 A | 9/2017 |
| CN | 107218459 A | 9/2017 |
| CN | 107300067 A | 10/2017 |
| CN | 107300076 A | 10/2017 |
| CN | 107448692 A | 12/2017 |
| CN | 107476848 A | 12/2017 |
| CN | 206942840 U | 1/2018 |
| CN | 107676185 A | 2/2018 |
| CN | 207161176 U | 3/2018 |
| CN | 108194213 A | 6/2018 |
| CN | 108729978 A | 11/2018 |
| DE | 10 2007 050 087 B3 | 6/2009 |
| JP | 2002-042969 A | 2/2002 |
| WO | WO 2005/061865 A1 | 7/2005 |
| WO | WO 2011/071518 A1 | 6/2011 |

* cited by examiner

PIPELINE DETECTION DEVICE AND METHOD

CROSS-REFERENCE TO RELATED APPLICATIONS

The present patent application is a National Phase entry of PCT Application No. PCT/CN2018/096140, filed Jul. 18, 2018, which claims priority of Chinese patent application No. 201710801651.4, filed on Sep. 7, 2017, and entitled "Pipeline Detection Device and Method", the entirety of which is incorporated herein by reference.

TECHNICAL FIELD

The invention relates to the field of automobiles, and in particular, to a pipeline detection device and method for detecting whether a pipeline of an automobile is disconnected or broken.

BACKGROUND

When an engine is operating, high-pressure combustible gas mixture and combusted gas in a combustion chamber may more or less leak into a crankcase through a gap between a piston group and a cylinder, causing blow-by. Blow-by gas mainly includes uncombusted fuel gas, water vapor and exhaust gas. The blow-by gas may dilute engine oil, reduce performance and properties of the engine oil, and accelerate oxidation and deterioration of the engine oil. The water vapor in the blow-by gas may condense in the engine oil, forming sludge and blocking the oil path. Acidic gas in the blow-by gas may get into the lubrication system, leading to corrosion and accelerated wear of engine parts. The blow-by gas may also make the crankcase pressure too high, which will damage the seal of the crankcase and even cause oil leakage.

To prevent excessive pressure in the crankcase, extend service life of engine oil, reduce part wear and corrosion, and prevent engine oil leakage, crankcase ventilation is usually enforced. In addition, in order to prevent the volatilization of fuel components into the air, which causes the vehicle's evaporative emissions to exceed standards, closed crankcase ventilation systems are generally used. Specifically, a pipe is connected from a clean side of an air filter to an engine cylinder head cover or an oil and gas separator to extract air by using the negative pressure of the clean side of the air filter. This pipe connection is hereinafter referred to as the "crankcase pipeline system".

The crankcase pipeline system includes a main pipeline and a connector that connects the main pipeline with other pipelines. Engine vibration, temperature changes, material aging and the like will affect the integrity of the crankcase pipeline system. For example, pipe break and connector falling off may occur.

SUMMARY

The present invention provides a pipeline detection device and method, which are used to detect whether an abnormality, such as a pipeline break or a connector falling off, occurs in such as a crankcase pipeline system in an automobile. The specific solution is as follows:

A pipeline detection device, applied to a pipeline system of an automobile. The pipeline system includes: a main pipeline; a male connector that connects the main pipeline with other pipelines in the pipeline system; and a connection terminal disposed at an end of the main pipeline, the connection terminal being used to connect the end of the main pipeline with the male connector. The pipeline detection device includes: a detection circuit, an anode end of the detection circuit being connected with a power supply end of an ECU (Electronic Control Unit) unit of the automobile, and a cathode end of the detection circuit being connected with a ground end of the ECU unit; and a conductive structure provided at the connection terminal, the conductive structure being in conducting state when the connection terminal correctly connects the main pipeline with the male connector, so that a current loop is formed between the detection circuit and the ECU unit.

In the pipeline detection device described above, the connection terminal is a female connector, and the conductive structure includes a conductive switch provided inside the female connector. When the male connector is docked with the female connector, the male connector triggers the conductive switch inside the female connector to close, so that a current loop is formed between the detection circuit and the ECU unit.

In the pipeline detection device described above, the end of the main pipeline is fastened to the male connector by using a clamp which is used as the connection terminal, and the conductive structure includes a circuit plug provided on the clamp and a conductive sheet provided in a lock ring of the male connector. When the main pipeline is sleeved on the male connector, the circuit plug is inserted into the lock ring of the male connector and is electrically connected with the conductive sheet, so that a current loop is formed between the detection circuit and the ECU unit.

In the pipeline detection device described above, a voltage reduction device is provided in the detection circuit. The voltage reduction device may be a resistor or a diode.

In the pipeline detection device described above, a high-level resistor is provided between the power supply end of the ECU unit and the anode end of the detection circuit.

In the pipeline detection device described above, a low-level resistor is provided between the ground end of the ECU unit and the cathode end of the detection circuit.

In the pipeline detection device described above, the detection circuit is at least partially attached to a surface of the main pipeline, and an outer surface of the detection circuit is covered with an insulating protective layer.

In the pipeline detection device described above, the detection circuit is at least partially buried in the main pipeline and is led out from the end of the main pipeline.

A method for detecting a pipeline system of an automobile, the pipeline system includes: a main pipeline; a male connector that connects the main pipeline with other pipelines in the pipeline system; and a connection terminal disposed at an end of the main pipeline, the connection terminal being used to connect the end of the main pipeline with the male connector. The detection method includes: connecting an anode end of the detection circuit to a power supply end of an ECU unit of the automobile, and connecting a cathode end of the detection circuit to a ground end of the ECU unit; causing a conductive structure provided at the connection terminal to be in conducting state when the connection terminal correctly connects the main pipeline with the male connector, so that a current loop is formed between the detection circuit and the ECU unit; and determining, based on a voltage at the anode end of the detection circuit and/or a voltage at the cathode end of the detection circuit, whether the pipeline system functions normally.

In the pipeline detection method described above, a voltage reduction device, such as a resistor or a diode, is provided in the detection circuit, and a high-level resistor is provided between the power supply end of the ECU unit and the anode end of the detection circuit. In this way, determining, based on the voltage at the anode end of the detection circuit, whether the pipeline system functions normally includes: determining that the pipeline system functions normally when the voltage at the anode end of the detection circuit is greater than 0 and less than an input voltage of the ECU unit; determining that a to-ground short circuit occurs at the anode end of the detection circuit when the voltage at the anode end of the detection circuit is close to 0; and determining that an abnormality occurs at the pipeline system when the voltage at the anode end of the detection circuit is close to the input voltage of the ECU unit.

In the pipeline detection method described above, a voltage reduction device, such as a resistor or a diode, is provided in the detection circuit, and a low-level resistor is provided between the ground end of the ECU unit and the cathode end of the detection circuit. In this way, determining, based on the voltage at the cathode end of the detection circuit, whether the pipeline system functions normally includes: determining that the pipeline system functions normally when the voltage at the cathode end of the detection circuit is greater than 0 and less than an input voltage of the ECU unit; determining that an abnormality occurs at the pipeline system when the voltage at the cathode end of the detection circuit is close to 0; and determining that a to-power short circuit occurs at the cathode end of the detection circuit when the voltage at the cathode end of the detection circuit is close to the input voltage of the ECU unit.

BRIEF DESCRIPTION OF THE DRAWINGS

In order to explain the technical solution in the examples of the present invention more clearly, the examples of the present invention will be described below with reference to the accompanying drawings. Obviously, the drawings in the following description are only some examples of the present invention. For those of ordinary skill in the art, other drawings can be obtained based on these drawings without creative efforts.

DETAILED DESCRIPTION OF THE EMBODIMENTS

Figure 1:
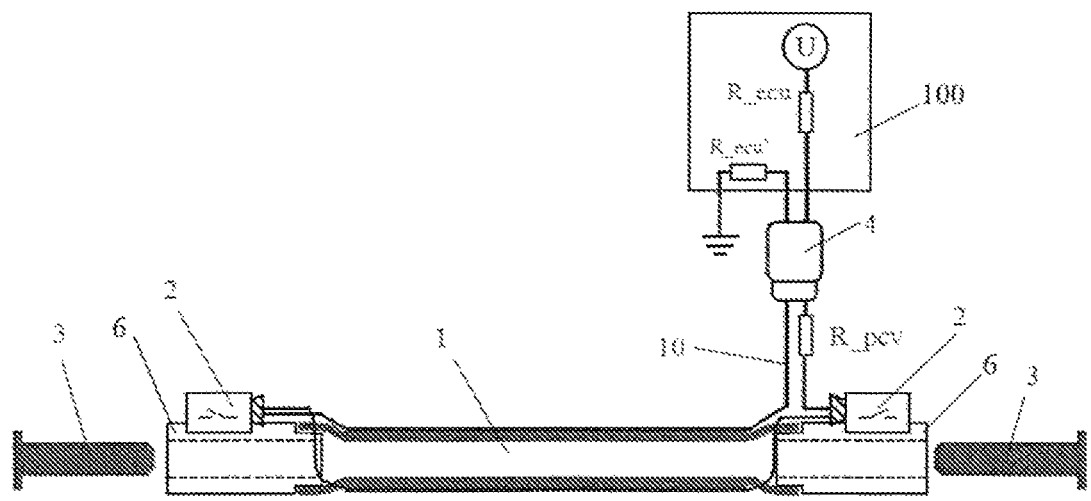
FIG. 1 is a schematic diagram of a connection relationship between a detection circuit device and a crankcase pipeline system according to an example of the present invention.

Detailed steps and detailed structures will be proposed in the following description in order to explain the technical solution of the present invention. The preferred examples of the present invention are described in detail below. However, in addition to these detailed descriptions, the present invention may have other embodiments.

The present invention designs a pipeline detection device that may form a current loop, which is configured to monitor whether an abnormality such as break of a pipeline or a drop/disconnection of a connector occurs in for example a crankcase pipeline system of an automobile. The crankcase pipeline system includes a main pipeline and a male connector that connects the main pipeline with other pipelines. A connection terminal is disposed at an end of the main pipeline and is used to connect the main pipe with the male connector. The pipeline detection device includes a detection circuit and a conductive structure provided at the connection terminal. The detection circuit contains a voltage reduction device. The voltage reduction device may be a diode, a resistor, or any other device that generates a certain voltage drop on the detection circuit. In this way, after the detection circuit is disposed on the main pipeline, the conductive structure will cause the detection circuit to be in a conducting state via the connection terminal to form a conductive loop that sequentially passes through the power supply end of an ECU unit, the conductive structure, and the ground end of the ECU unit. When the crankcase pipeline system is intact, the detection circuit is in the conducting state and forms the above-mentioned conductive loop with the ECU unit. If other pipelines fall off from the main pipeline, or the main pipeline is broken in the middle, the conductive loop will be open/broken accordingly, and the ECU unit may quickly detect the fault.

In addition, the detection circuit is provided with a voltage reduction device, such as a diode or a resistor, so as to be able to detect an event of to-power short circuit occurring on the cathode end of the detection circuit connected with the ground end of the ECU unit, or an event of to-ground short circuit occurring on the anode end of the detection circuit connected with the power supply end of the ECU unit. The voltage reduction device may be a resistor, a diode, or other devices capable of reducing voltage, which is not limited in the present invention. For ease of description, a resistor is taken as an example of the voltage reduction device in the following, but it should not be construed as limiting the present invention.

Hereafter a crankcase pipeline system is taken as an example of the application object, and the specific solution of the present invention is described below. However, those skilled in the art should understand that the present invention can also be applied to other pipeline systems of automobiles.

A pipeline detection device based on a conductive loop mechanism is provided, which may be used to detect whether a pipeline break or a connector dropout/disconnection occurs in a crankcase pipeline system. The crankcase pipeline system includes a main pipeline 1 and a male connector connected with other pipelines in the crankcase pipeline system is connected with the main pipe 1. In addition, a connection terminal is disposed at an end of the main pipeline 1 and configured to connect the end of the main pipeline 1 with the male connector. The pipeline detection device includes a detection circuit 10 fixed at least partially on the main pipeline 1 and a conductive structure provided at the connection terminal. In this way, when the main pipeline 1 is connected with the male connector via the connection terminal, the detection circuit 10 is caused to be in a conducting state through the conductive structure at the connection terminal, so that a current loop is formed between the detection circuit 10 and an ECU unit 100.

In addition, two ends of the detection circuit 10 are connected with a power supply end and a ground end of the ECU unit 100 of the automobile, respectively. In this way, an anode end of the detection circuit 10 starts at the power input end of the ECU unit 100 and a cathode end of the detection circuit 10 ends at the ground end of the ECU unit 100. Therefore, the entire conductive loop does not need a metal ground line in the proximity of the engine of the automobile, which simplifies the operation.

In addition, a resistor is provided in the detection circuit 10 and configured for diagnosis of the detection circuit 10 when a cathode-to-power short circuit or an anode-to-ground short circuit occurs.

In an example of the present invention, as shown in FIG. 1, the male connector may be a quick-plugging male connector 3, the connection terminal may be a quick-connecting female connector 6, and a conductive switch 2 as the conductive structure is provided on the quick-connecting female connector 6. Specifically, as shown in FIG. 1, one end of the quick-connecting female connector 6 is disposed on the main pipeline 1, and the other end may be inserted in by the quick-plugging male connector 3. In addition, after the quick-plugging male connector 3 is docked with the quick-connecting female connector 6, the quick-plugging male connector 3 can close the conductive switch 2 by squeezing a contact piece of the conductive switch 2, thereby causing the detection circuit 10 to be in a conducting state and forming a conductive loop from the power supply end of the ECU unit 100 to the ground end of the ECU unit 100 via the detection circuit 10.

Figure 2:
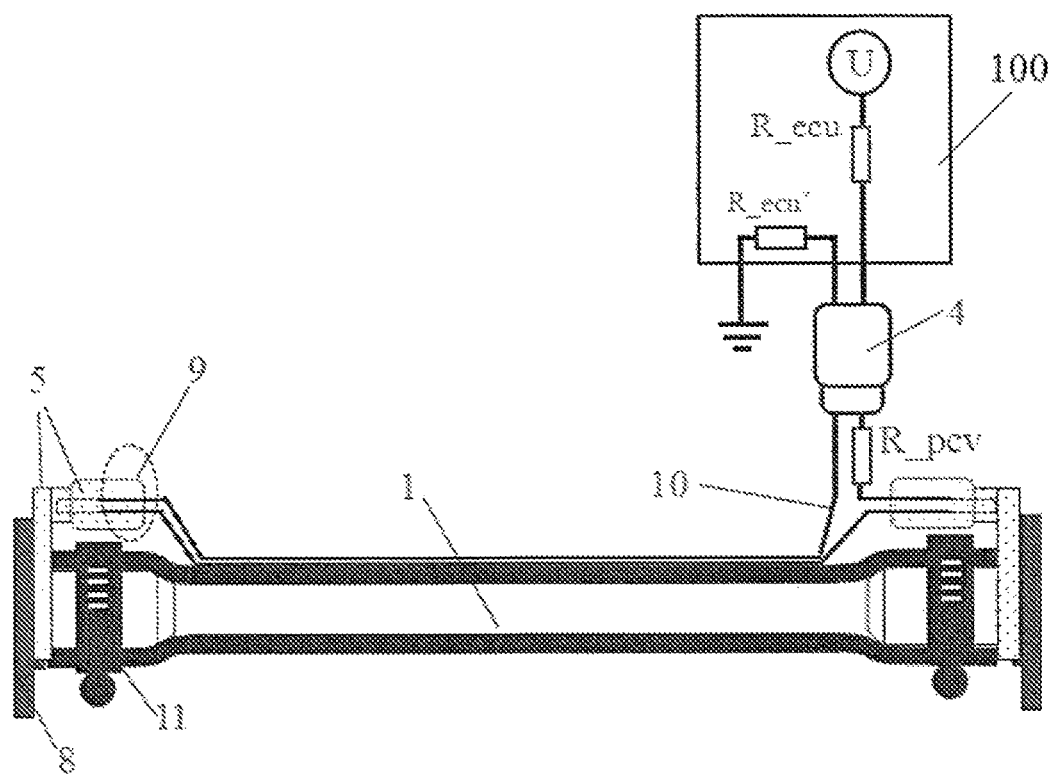
FIG. 2 is a schematic diagram of a connection relationship between a detection circuit device and a crankcase pipeline system according to another example of the present invention.

In another example of the present invention, as shown in FIG. 2, the male connector may be a male connector 8 provided with a lock ring 5, and the connection terminal may be a clamp 11 disposed at the end of the main pipeline 1. In this case, the end of the main pipeline 1 is a hose and may be fastened to the male connector 8 by using the clamp 11. The conductive structure includes a circuit plug 9 disposed on the end of the main pipeline 1 and a conductive sheet inside the lock ring 5 provided on the male connector 8. In this way, when the main pipeline 1 is sleeved and secured on the male connector 8 by using the clamp 11, the circuit plug 9 is inserted into the lock ring 5 on the male connector 8, so that the conductive sheet in the lock ring 5 is connected with the circuit plug 9 to cause the detection circuit 10 to be in conducting state, and a conductive loop is formed from the power supply end of the ECU unit 100 to the ground end of the ECU unit via the detection circuit 10.

Figure 3:
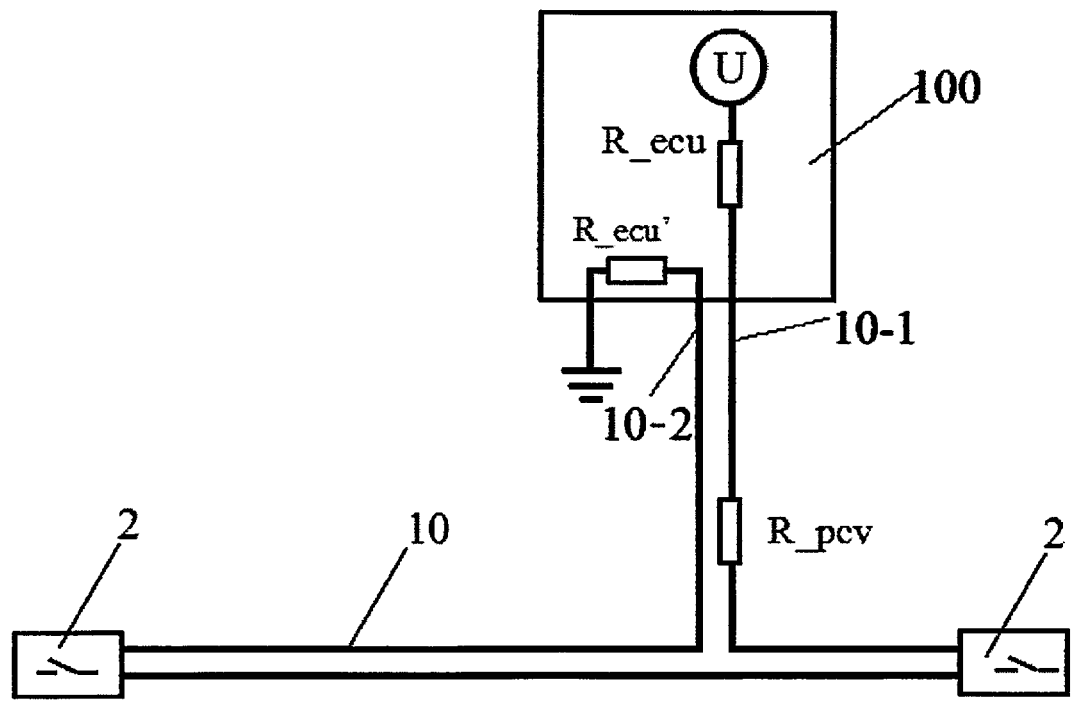
FIG. 3 is an equivalent circuit diagram of a mechanism of a detection circuit device according to an example of the present invention.
Figure 4:
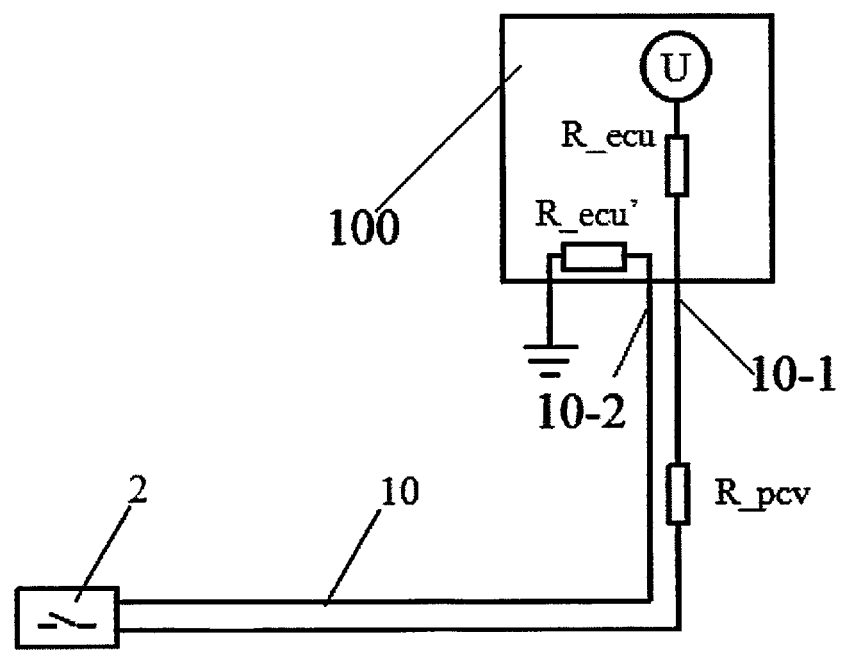
FIG. 4 is an equivalent circuit diagram of a mechanism of a detection circuit device according to another example of the present invention.

In actual applications, a conductive structure for realizing the conducting state of the detection circuit 10 may be provided at one end of the main pipeline 1 as shown in FIG. 4, or two conductive structures for realizing the conducting state of the detection circuit 10 may be provided at both ends of the main pipeline 1 as shown in FIGS. 1, 2, 3, 5, and 7, as long as the conductive structure can form a current loop between the detection circuit 10 and the ECU unit 100 when the main pipeline 1 is properly connected with other pipelines through the one or two connection terminals and the one or two male connectors.

In another example, a resistor may be provided in the detection circuit 10 to detect a cathode-to-power short circuit or an anode-to-ground short circuit of the detection circuit 10.

In an example of the present invention, as shown in FIG. 3 or FIG. 4, a high-level resistor R_ecu is connected between the power supply end of the ECU unit 100 and the anode end 10-1 of the detection circuit 10. In this way, the resistor R_pcv in the detection circuit 10 enables the ECU unit 100 to distinguish between normal functioning of the detection circuit 10 and the abnormality that a to-ground short circuit occurs at the anode end 10-1 of the detection circuit 10 near the power supply end of the ECU unit 100. The high-level resistor R_ecu may be a single resistor or a plurality of resistors located between the power supply end of the ECU unit and the anode end 10-1 of the detection circuit 10.

In an example of the present invention, as shown in FIG. 3 or FIG. 4, a low-level resistor R_ecu' is connected between the ground end of the ECU unit 100 and the cathode end 10-2 of the detection circuit 10. In this way, the resistor R_pcv in the detection circuit 10 enables the ECU unit 100 to distinguish between the normal functioning of the detection circuit 10 and the abnormality that a to-power short circuit occurs at the cathode end 10-2 of the detection circuit 10 near the ground end of the ECU 100. The low-level resistor R_ecu' may be a single resistor or a plurality of resistors disposed between the ground end of the ECU unit 100 and the cathode end 10-2 of the detection circuit 10.

In an example of the present invention, the detection circuit 10 is attached to the surface of the main pipeline 1, and both the main pipeline 1 and the detection circuit 10 are covered externally with an insulating protective layer. Alternatively, the detection circuit 10 is buried in the main pipeline 1 and led out from the end of the main pipeline 1. In this way, the metal portion of the detection circuit 10 may be prevented from being exposed. In addition, as shown in FIG. 1 and FIG. 2, the detection circuit 10 may be bundled together by a bundling belt 4 and connected with the ECU unit 100. In this way, because there are no exposed wire ends, the entire circuit is not easily affected by the environment.

After the male connector in the crankcase pipeline system is connected with the main pipeline 1 via the connection terminal, the detection circuit 10 and the ECU unit 100 form a loop with the help of the conductive structure in the connection terminal. When a disconnection occurs at the connection terminal, for example, the male connector 3 or the male connector 8 falls off from the main pipeline 1, due to the lack of a trigger mechanism for causing the conductive structure to be in conducting state, the current loop formed by the detection circuit 10 and the ECU unit 100 turns into a broken circuit, so that the abnormality can be detected by the ECU unit 100.

Figure 5:
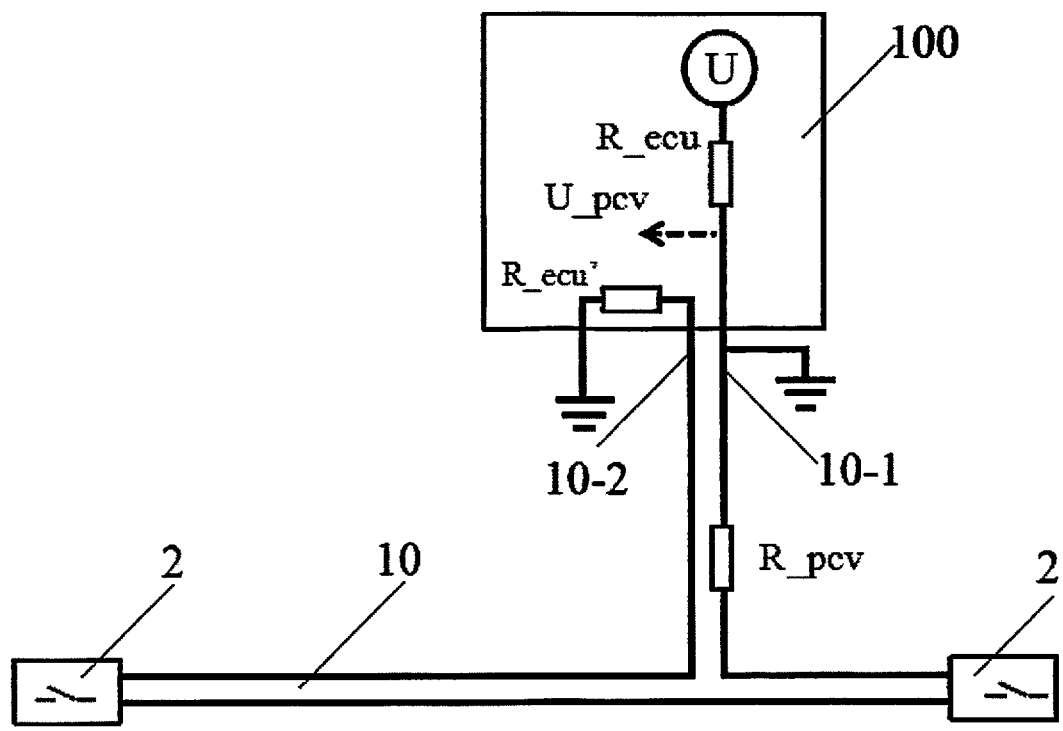
FIG. 5 is a schematic diagram of a mechanism for detecting occurrence of an anode-to-ground short circuit occurring in a detection circuit according to an example of the present invention.

As the service time increases, the insulating layer on the surface of the detection circuit 10 may be corroded or worn, and the detection circuit 10 may come into contact with other metal parts of the automobile. For example, there may be a case where the anode end 10-1 of the detection circuit 10 is grounded, which is referred to as an anode-to-ground short circuit, as shown in FIG. 5. Considering this, in the present example, a resistor R_pcv is provided in the detection circuit 10. In this way, when a to-ground short circuit occurs at the anode end 10-1 of the detection circuit 10 connected with the power supply end of the ECU unit 100, the voltage U_pcv at the anode of the detection circuit detected by the ECU unit 100 will be close to 0V.

If the resistor R_pcv is not disposed in the detection circuit 10, the resistance of the conductive wire inside the detection circuit 10 is almost zero (can be regarded as R_pcv'≈0). In this way, when the detection circuit 10 functions normally, the voltage at the anode of the detection circuit U_pcv is close to 0V; but when a to-ground short circuit occurs at the anode end 10-1 of the detection circuit 10, the voltage at the anode of the detection circuit U_pcv will be equal to 0V. Therefore, if the resistor R_pcv is not disposed in the detection circuit 10, even if a to-ground short circuit occurs at the anode end 10-1 of the detection circuit 10, this fault cannot be accurately diagnosed.

Considering the occurrence of the above situation, the present invention provides a resistor R_pcv in the detection circuit 10. In this way, when the detection circuit 10 functions normally, because the resistor R_pcv itself has a certain resistance value, the voltage at the anode of the detection circuit U_pcv will be equal to U*(R_pcv+R_ecu')/(R_ecu+R_pcv+R_ecu'), that is, the voltage at the anode of the detection circuit will not be zero. In addition, when an anode-to-ground short circuit occurs in the detection circuit 10, the ECU unit 100 detects that the voltage at the anode of the detection circuit U_pcv is close to 0V. Therefore, that the voltage at the anode of the detection circuit U_pcv is 0 can be used as a diagnostic basis for determining whether an anode-to-ground short circuit occurs in the detection circuit 10.

In addition, when a pipe break or a connector falling off/disconnection occurs on the main pipeline 1, the current loop formed by the detection circuit 10 and the ECU unit 100 is open, and the ECU unit 100 detects that the voltage at the anode of the detection circuit U_pcv is equal to the input voltage U of the ECU unit 100, so that the break/disconnection of main pipeline 1 can be accurately detected, ensuring the accuracy of the detection.

Figure 6:
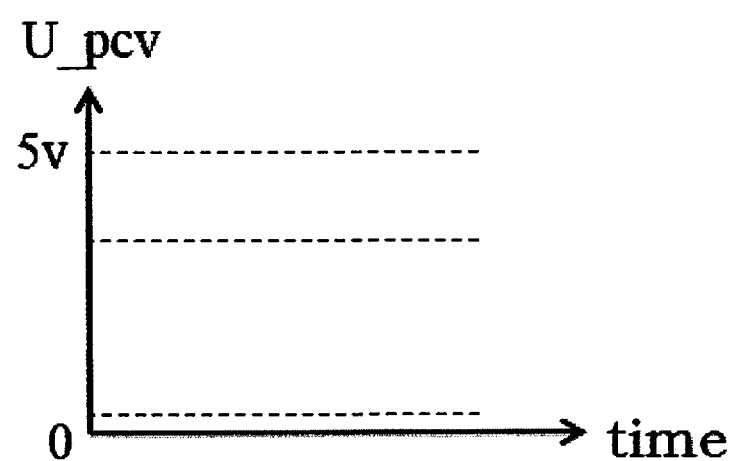
FIG. 6 is a schematic diagram of a voltage at an anode of the detection circuit shown in FIG. 5.

From the above description, it may be known that by disposing the resistor R_pcv in the detection circuit 10, as shown in FIG. 6, when the detection circuit 10 functions normally and the main pipeline 1 is intact, the ECU unit 100 will detect that the voltage at the anode of the detection circuit U_pcv is greater than 0 and less than the input voltage U of the ECU; when the detection circuit 10 functions normally but the main pipeline 1 is disconnected, the ECU unit 100 will detect that the voltage at the anode of the detection circuit U_pcv is equal to the input voltage U of the ECU; and when an anode-to-ground short circuit occurs in the detection circuit 10, the ECU unit 100 will detect that the voltage at the anode of the detection circuit U_pcv is close to 0V. FIG. 6 shows the ECU input voltage U is 5V. Those skilled in the art should understand that this is only an example, and the input voltage U of the ECU may be other values according to actual conditions, which is not limited in the present invention.

Figure 7:
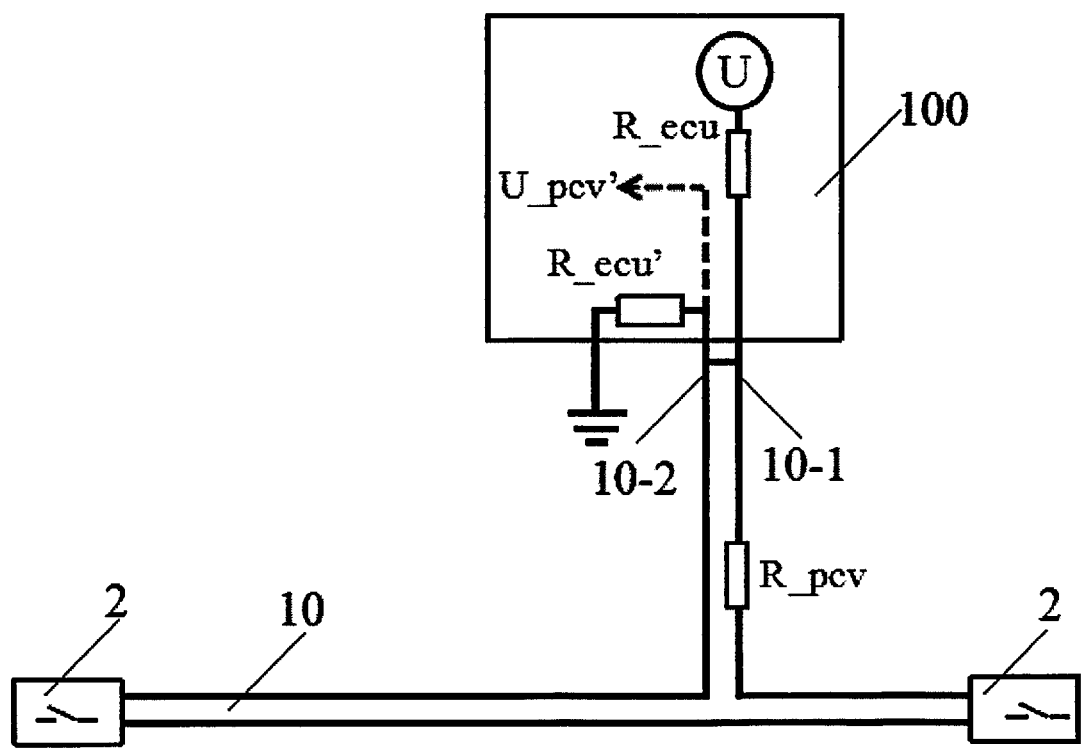
FIG. 7 is a schematic diagram of a mechanism for detecting occurrence of a cathode-to-power short circuit in a detection circuit according to an example of the present invention.

As the service time increases, the insulating layer on the surface of the detection circuit 10 may be corroded or worn, and there may be a case where the cathode end 10-2 of the detection circuit 10 is connected with the power supply end of the ECU unit 100, which is referred to as a cathode-to-power short circuit, as shown in FIG. 7. Considering this, in the present example, a resistor R_pcv is provided in the detection circuit 10. In this way, when a to-power short circuit occurs at the cathode end 10-2 of the detection circuit that is connected with the ground end of the ECU unit 100, the ECU unit 100 detects that the voltage U_pcv' at the cathode of the detection circuit will be equal to the input voltage U of the ECU unit 100 (for example, 5V); while when the detection circuit 10 functions normally, the voltage at the cathode of the detection circuit U_pcv' will be equal to U*R_ecu'/(R_ecu'+R_pcv+R_ecu), rather than the input voltage U of the ECU unit 100.

In addition, when the pipeline 1 is broken or the connector is disconnected, the current loop formed by the detection circuit 10 and the ECU unit 100 is open, and the ECU unit 100 detects that the voltage at the cathode of the detection circuit U_pcv' is close to 0V. Therefore, it can be accurately detected whether the main pipeline 1 is disconnected/broken.

If the resistor R_pcv is not disposed in the detection circuit 10, the resistance of the conductive wire inside the detection circuit 10 is almost zero. In this way, when the detection circuit 10 functions normally, the voltage at the cathode of the detection circuit U_pcv' will be close to the input voltage U of the ECU unit 100; but when a to-power short circuit occurs at the cathode end 10-2 of the detection circuit 10, the voltage at the cathode of the detection circuit U_pcv' will be equal to the input voltage of the ECU unit 100. Therefore, if the resistor R_pcv is not disposed in the detection circuit 10, even if a cathode-to-power short circuit occurs in the detection circuit 10, the fault cannot be accurately diagnosed.

Figure 8:
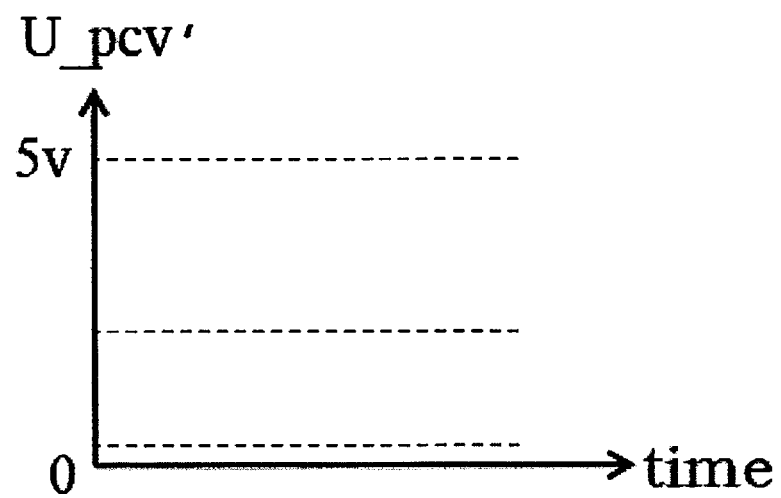
FIG. 8 is a schematic diagram of a voltage at a cathode of the detection circuit shown in FIG. 7.

From the above description, it may be known that by disposing the resistor R_pcv in the detection circuit 10, as shown in FIG. 8, when the detection circuit 10 functions normally and the main pipeline 1 is intact, the ECU unit 100 will detect that the voltage at the cathode of the detection circuit U_pcv' is greater than 0 and less than the input voltage U of the ECU; when the detection circuit 10 functions normally but the main pipeline 1 is disconnected/broken, the ECU unit 100 will detect that the voltage at the cathode of the detection circuit U_pcv' is close to 0V; and when a cathode-to-power short circuit occurs in the detection circuit 10, the ECU unit 100 will detect that the voltage at the cathode of the detection circuit U_pcv' is equal to the input voltage U of the ECU. FIG. 8 shows the ECU input voltage U is 5V. Those skilled in the art should understand that this is only an example, and the input voltage U of the ECU may be other values according to actual conditions, which is not limited in the present invention.

The preferred examples of the present invention have been described above. Any person skilled in the art can make many possible changes and modifications to the technical solution of the present invention or modify it to the equivalent examples with equivalent effects without departing from the scope of the technical solution of the present invention. Therefore, without departing from the content of the technical solution of the present invention, any simple alterations, equivalent changes, and modifications made to the above examples according to the technical essence of the present invention still fall within the protection scope of the technical solution of the present invention.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A pipeline detection device applicable to a pipeline system of an automobile,
   wherein the pipeline system comprises:
   a main pipeline,
   a male connector that connects the main pipeline with other pipelines in the pipeline system, and
   a connection terminal disposed at an end of the main pipeline, the connection terminal being configured to connect the end of the main pipeline with the male connector; and
   the pipeline detection device comprises:
   a detection circuit, an anode end of the detection circuit being connected with a power supply end of an ECU (Electronic Control Unit) unit of the automobile, and a cathode end of the detection circuit being connected with a ground end of the ECU unit, and
   a conductive structure provided at the connection terminal, the conductive structure being in conducting state when the connection terminal correctly connects the main pipeline with the male connector, so that a current loop is formed between the detection circuit and the ECU unit and whether the pipeline system functions normally is determinable based on a voltage at the anode end of the detection circuit and/or a voltage at the cathode end of the detection circuit.

2. The pipeline detection device according to claim 1, wherein:
   the connection terminal is a female connector,
   the conductive structure comprises a conductive switch provided inside the female connector, and
   when the male connector is docked with the female connector, the male connector triggers the conductive switch inside the female connector to close, so that the current loop is formed between the detection circuit and the ECU unit.

3. The pipeline detection device according to claim 1, wherein:
   the end of the main pipeline is fastened to the male connector by using a clamp which is used as the connection terminal,
   the conductive structure comprises a circuit plug provided on the clamp and a conductive sheet provided in a lock ring of the male connector, and
   when the main pipeline is sleeved on the male connector, the circuit plug is inserted into the lock ring of the male connector and is electrically connected with the conductive sheet, so that the current loop is formed between the detection circuit and the ECU unit.

4. The pipeline detection device according to claim 1, wherein a voltage reduction device is provided in the detection circuit.

5. The pipeline detection device according to claim 4, wherein the voltage reduction device is a resistor.

6. The pipeline detection device according to claim 5, wherein a high-level resistor is provided between the power supply end of the ECU unit and the anode end of the detection circuit.

7. The pipeline detection device according to claim 5, wherein a low-level resistor is provided between the ground end of the ECU unit and the cathode end of the detection circuit.

8. The pipeline detection device according to claim 1, wherein:
   the detection circuit is at least partially attached to a surface of the main pipeline, and
   an outer surface of the detection circuit is covered with an insulating protective layer.

9. The pipeline detection device according to claim 1, wherein the detection circuit is at least partially buried in the main pipeline and is led out from the end of the main pipeline.

10. A detection method for a pipeline system of an automobile using the pipeline detection device according to claim 1,
    wherein the pipeline system comprises:
    a main pipeline,
    a male connector that connects the main pipeline with other pipelines in the pipeline system, and
    a connection terminal disposed at an end of the main pipeline, the connection terminal being configured to connect the end of the main pipeline with the male connector; and
    the detection method comprises:
    connecting an anode end of the detection circuit with a power supply end of an ECU unit of the automobile, and connecting a cathode end of the detection circuit with a ground end of the ECU unit;
    causing a conductive structure provided at the connection terminal to be in conducting state when the connection terminal correctly connects the main pipeline with the male connector, so that a current loop is formed between the detection circuit and the ECU unit; and
    determining, based on a voltage at the anode end of the detection circuit and/or a voltage at the cathode end of the detection circuit, whether the pipeline system functions normally.

11. The method according to claim 10, wherein:
    a voltage reduction device is provided in the detection circuit,
    a high-level resistor is provided between the power supply end of the ECU unit and the anode end of the detection circuit, and determining, based on the voltage at the anode end of the detection circuit, whether the pipeline system functions normally comprises:

determining that the pipeline system functions normally when the voltage at the anode end of the detection circuit is greater than 0 and less than an input voltage of the ECU unit;

determining that a to-ground short circuit occurs at the anode end of the detection circuit when the voltage at the anode end of the detection circuit is close to 0; and determining that an abnormality occurs at the pipeline system when the voltage at the anode end of the detection circuit is close to the input voltage of the ECU unit.

12. The method according to claim 10, wherein:

a voltage reduction device is provided in the detection circuit, a low-level resistor is provided between the ground end of the ECU unit and the cathode end of the detection circuit, and determining, based on the voltage at the cathode end of the detection circuit, whether the pipeline system functions normally comprises:

determining that the pipeline system functions normally when the voltage at the cathode end of the detection circuit is greater than 0 and less than an input voltage of the ECU unit;

determining that an abnormality occurs at the pipeline system when the voltage at the cathode end of the detection circuit is close to 0; and determining that a to-power short circuit occurs at the cathode end of the detection circuit when the voltage at the cathode end of the detection circuit is close to the input voltage of the ECU unit.

\* \* \* \* \*